Figure 1:
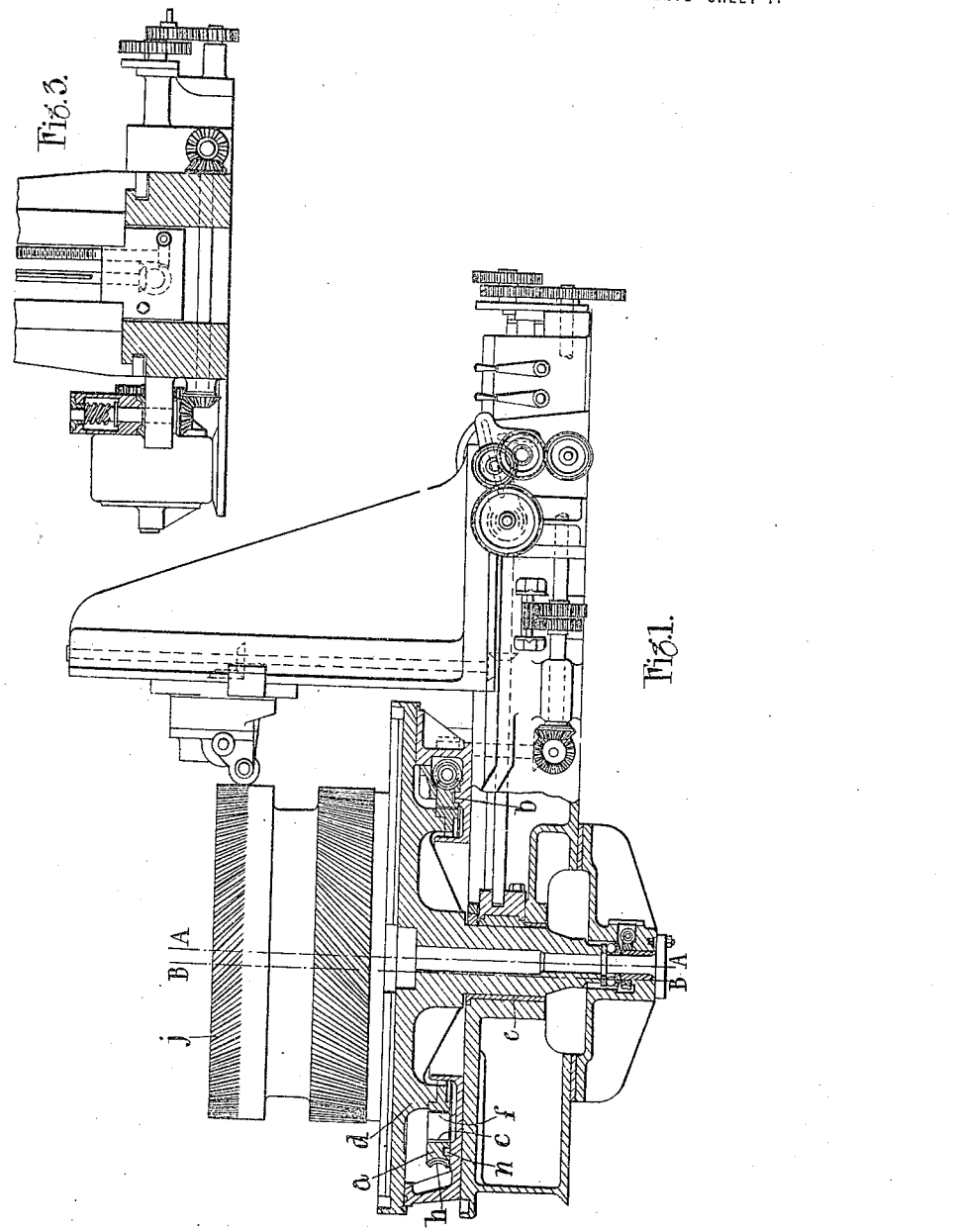

C. A. PARSONS, A. Q. CARNEGIE & S. S. COOK.
GEAR CUTTING MACHINE.
APPLICATION FILED FEB. 27, 1914.

1,194,221.

Patented Aug. 8, 1916.
4 SHEETS—SHEET 2.

WITNESSES
E. W. Hamilton.
Ewd L. Tolson.

INVENTORS
CHARLES A. PARSONS,
ALFRED Q. CARNEGIE and
STANLEY S. COOK.
BY
ATTORNEYS

UNITED STATES PATENT OFFICE.

CHARLES ALGERNON PARSONS AND ALFRED QUINTIN CARNEGIE, OF NEWCASTLE-UPON-TYNE, AND STANLEY SMITH COOK, OF WALLSEND, ENGLAND; SAID CARNEGIE AND COOK ASSIGNORS TO SAID PARSONS.

GEAR-CUTTING MACHINE.

1,194,221.  Specification of Letters Patent.  Patented Aug. 8, 1916.

Application filed February 27, 1914. Serial No. 821,500.

*To all whom it may concern:*

Be it known that we, CHARLES ALGERNON PARSONS, K. C. B., and ALFRED QUINTIN CARNEGIE, both of Heaton Works, Newcastle-upon-Tyne, in the county of Northumberland, England, and STANLEY SMITH COOK, of Turbinia Works, Wallsend-on-Tyne, in the county of Northumberland, England, engineers, having invented certain new and useful Improvements in Gear-Cutting Machines, do hereby declare the following to be a full, clear, and exact description of the same.

This invention relates to the method and means for cutting teeth in gear wheels described in Patent applications Ser. No. 756762, filed on the 25th March, 1913, and Ser. No. 806567, filed on the 13th December, 1913, and has for its object to construct such wheels with a higher degree of accuracy than is obtainable with the usual processes at present adopted for cutting gear wheel teeth.

In the specifications of the applications above referred to a method and means are described for distributing in spirals irregularities in the work due to local irregularities in the parent or indexing gear whereby the periodic correspondence of the irregularities in the work with the irregularities of the parent gear rotating the same were destroyed, this result being attained by providing relative creep between the work and the parent gear.

The present invention consists in an improved apparatus for cutting gear teeth comprising a work carrying table, a ring the axis of which is non-coincident with the axis of the table, driving means engaging the ring to rotate it about its own axis and means upon the ring adapted to engage means upon and to impart rotary motion to the table, whereby the necessary shift of phase of errors between the several toothed pairs rotating the work is obtained.

The invention further consists in an apparatus for cutting gear, comprising a work table carrying a ring of teeth, a ring member having two sets of teeth and constrained to move about an axis not coincident with the axis of the table with one set of teeth at one point of its periphery in engagement with the teeth of the table, these two engaging sets of teeth having slightly different pitch circle diameters, and a driving worm or its equivalent engaging the other set of teeth of the ring whereby in successive revolutions of the work table periodic correspondence of the irregularities formed in the work with the irregularities in the several toothed pairs driving the work is destroyed.

Figure 2:
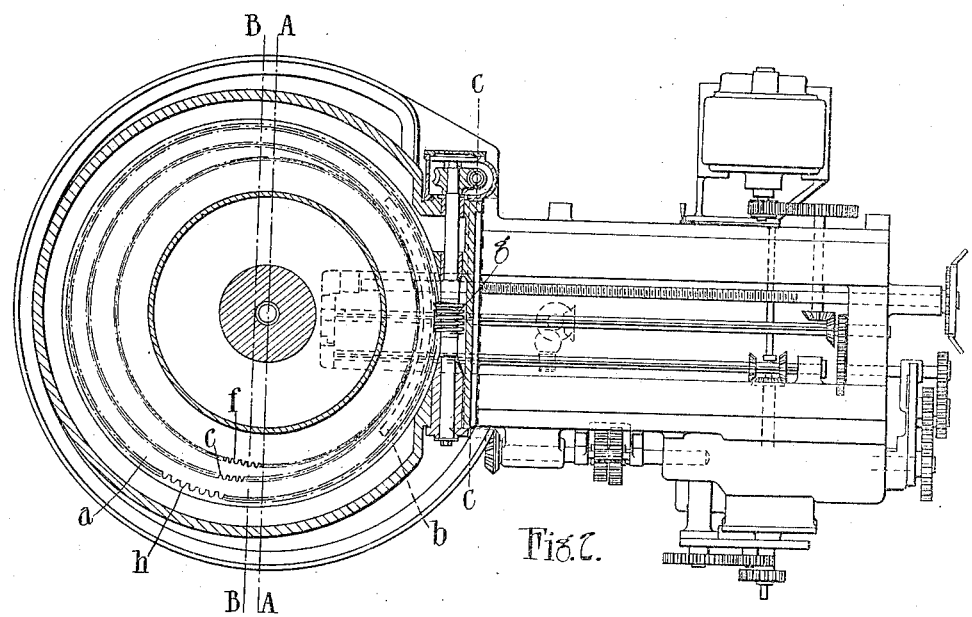
Figure 4:
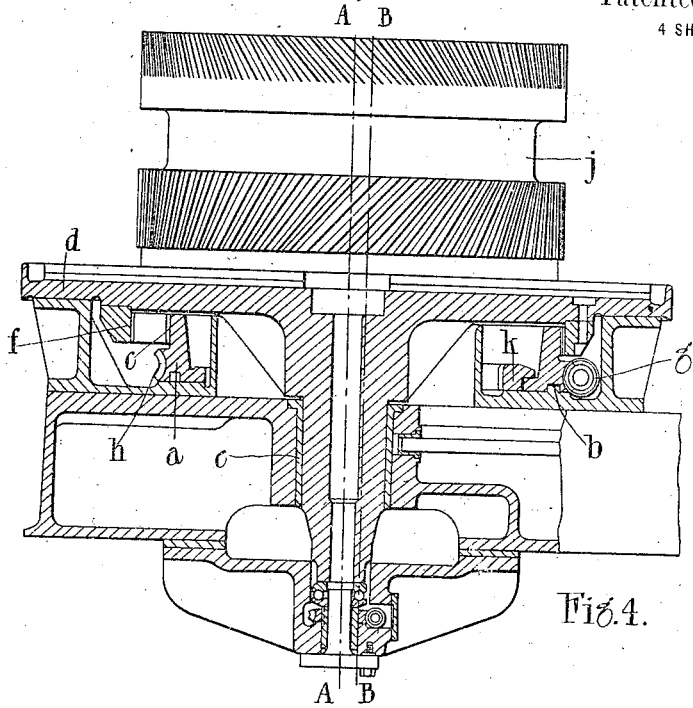
Figure 5:
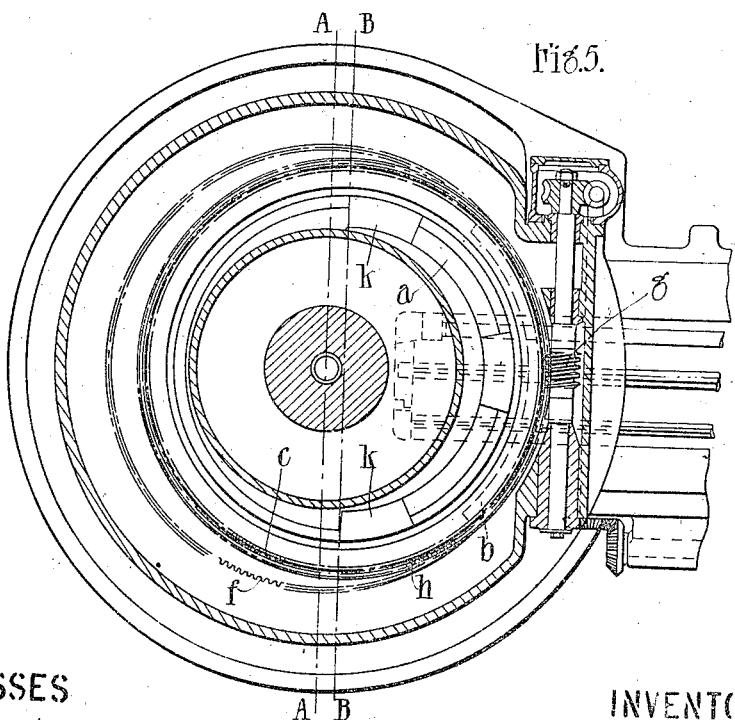
Figure 6:
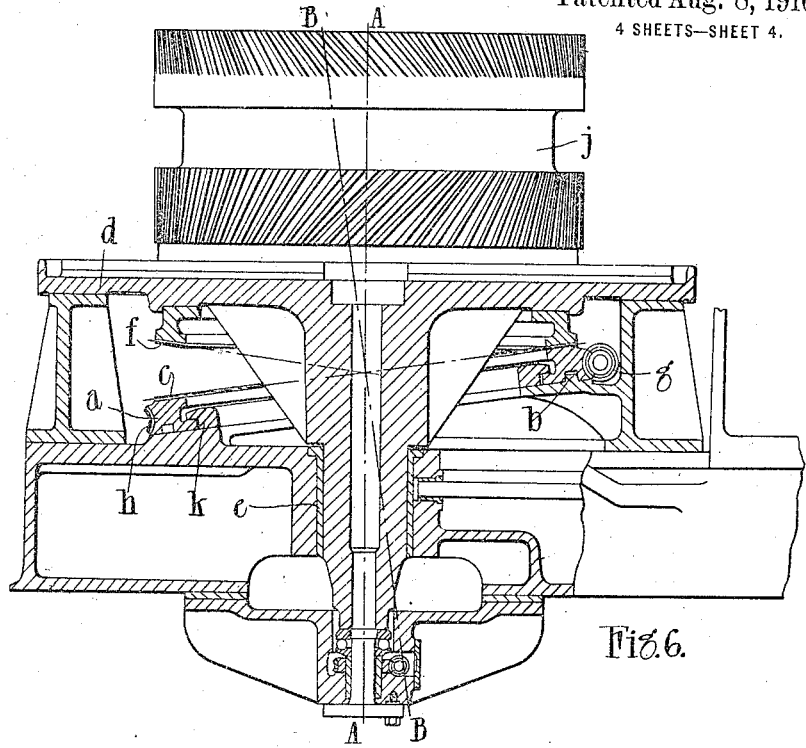
Figure 7:
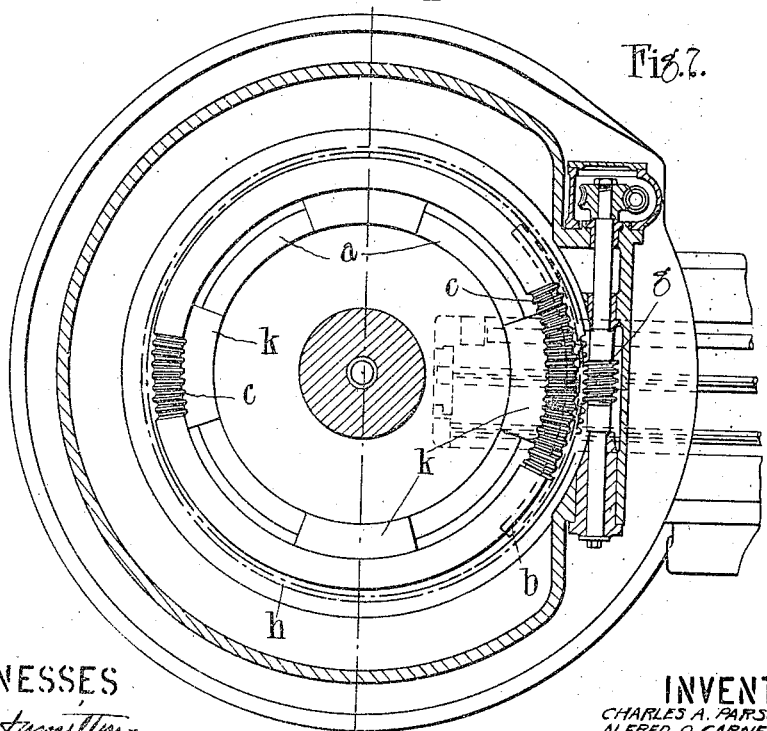

Figure 1 is a side elevation in part section of one form of gear cutting machine embodying the present invention. Fig. 2 is a plan of Fig. 1. Fig. 3 is a front elevation in part section on the line C C, Fig. 2. Figs. 4 and 5 illustrate in part sectional elevation and plan an alternative construction of gear cutting machine embodying the present invention, while Figs. 6 and 7 illustrate in part sectional elevation and plan a further alternative form of gear cutting machine.

In carrying the invention into effect according to one form and as shown in Figs. 1 to 3, a main driving or indexing worm wheel which takes the form of a ring, $a$, is constrained to move about its own axis by such means for instance as a projecting rib, $b$, engaging a groove $n$ in the ring $a$ and is provided with teeth, $c$, preferably of fine pitch which in this form are situated upon an inner periphery of the ring. The rib $b$ lies around the center line of the worm ring $a$, and extends for some distance in the region over which contact between the teeth $c$ and the teeth $f$ takes place. The work table, $d$, carrying the work, $j$, is mounted in bearings, $e$, and its position is eccentric with relation to the worm ring, $a$, its center line A A being so disposed, however, in relation to the center line B B of the worm ring, that teeth, $f$, formed upon a periphery of the table, $d$, engage with the teeth, $c$, on the worm ring, $a$. The worm ring, $a$, may be rotated by the usual driving means, such for instance as a worm, $g$, engaging teeth, $h$, on the ring, $a$, and transmits rotary movement to the work table, $d$, by reason of the engagement of the teeth $c$ of the ring with the teeth, $f$, of the work table, the rate of rotation of the work table, $d$, being greater than that of the worm ring, $a$, on account of the tooth circle of the ring being of larger diameter than the tooth circle of the work table.

The pitches of the worm teeth, $h$, and of the teeth, $c$, of the worm ring and the diameter of the pitch circles of the work table teeth, $f$, and the ring teeth, $c$, are so chosen as to give such a relative creep, viz. an acceleration of the work table in relation to the worm ring as will give the desired variation in phase of the errors chiefly of these errors which arise from inaccuracies of the worm and worm ring teeth. Slight inaccuracies in the teeth, $c$, of the ring and the teeth, $f$, on the work table are rendered ineffective by the large arc of engagement of these teeth.

It is preferable that the worm, $g$, should be situated in close proximity to the point of engagement between the teeth, $c$, of the ring and the teeth, $f$, of the work table by which means error due to spring of the ring, $a$, is eliminated.

An alternative construction of gear cutting machine embodying the present invention is illustrated in Figs. 4 and 5. In this modification, the teeth, $f$, carried by the work table, $d$, are formed as internal teeth instead of external teeth as was the case in the first described form. The ring member, $a$, in this construction is constrained to move about its axis B B by means of a projection, $b$, engaging a groove in the ring $a$, and dogs, $k$. The ring carries worm teeth, $h$, as before, which engage with the worm, $g$. The teeth, $c$, in this modification are formed as external teeth. The pitch circle of the teeth, $c$, is of slightly smaller diameter than the pitch circle of the teeth, $f$.

In Figs. 6 and 7, a further alternative construction is illustrated, in which the ring member, $a$, is placed in an inclined position and constrained to rotate about its axis B B by the stationary projection, $b$ upon the bed co-acting with a groove in the ring $a$, and the dogs, $k$. Upon the ring, $a$, worm teeth, $h$, are formed as in the two previous modifications, and are engaged by the worm $g$. The teeth, $c$, in this modification are formed upon the upper face of the ring, $a$, and engage bevel teeth, $f$, carried upon the work table. The pitch circle of the teeth, $c$, is slightly different from the pitch circle of the teeth, $f$, the pitch circle of $c$ being preferably greater than the pitch circle of $f$.

In all the modifications described it will be noticed that the teeth $f$ and $c$ which form the connection between the ring member and the work table engage over a considerable arc, and therefore the motion imparted by the teeth $c$, to the teeth, $f$, depends upon the average configuration of a number of teeth instead of depending upon the configuration of one or two teeth. It is further to be noticed that although the element, $a$, has been described throughout as a ring member, it may be, in some cases, replaced by a more or less solid wheel element. When formed as a ring, however, it is in all cases desirable that the teeth $f$ and $c$ should be arranged to engage at a point near the engagement of the parent gears, $g$ and $h$.

By the improved construction of apparatus for cutting gear teeth herein described, it will be seen that owing to the rotary motion imparted by the ring member, $a$, to the table, $d$, being at a slightly different angular speed from that of the ring member, a suitable shift of phase of the work table, $d$, in relation to the driven member, $h$, of the parent gear, in successive revolutions of the work table is obtained.

What we claim as our invention and desire to obtain by Letters Patent is:—

1. In combination, in a gear cutting machine, a rotating work carrying element, an indexing member rotating about an axis non-coincident with the axis of rotation of said element, means to rotate said indexing member, and means transmitting rotary motion from said member to said element.

2. In combination, in a gear cutting machine, a rotating work carrying element, a ring form indexing member rotating about an axis non-coincident with the axis of rotation of said element, means to rotate said indexing member, and means transmitting rotary motion from said member to said element.

3. In combination, a work table, a ring element adapted to rotate about an axis non-coincident with the axis of rotation of said table, teeth upon said ring, driving means engaging said teeth, teeth upon said table, further teeth upon said ring co-acting with said table teeth to transmit motion from said ring to said table.

4. In combination in a gear cutting machine, a work table, a ring element, means acting to constrain said element to rotate about an axis non-coincident with the axis of rotation of said table, teeth upon said ring, driving means engaging said teeth, teeth upon said table, teeth upon said ring co-acting with said table teeth to transmit rotary motion to the table, said co-acting teeth having slightly different pitch circle diameters.

5. In combination in a gear cutting machine, a work table, a ring element, means acting to constrain said element to rotate about an axis non-coincident with the axis of rotation of said table, teeth upon said ring, driving means engaging said teeth, internally projecting teeth upon said ring, teeth upon said table co-acting with said internally projecting ring teeth to transmit rotary motion to said table, said co-acting teeth having different pitch circle diameters.

In testimony whereof, we affix our signatures in presence of two witnesses.

CHARLES ALGERNON PARSONS.
  ALFRED QUINTIN CARNEGIE.
  STANLEY SMITH COOK.

Witnesses:
 FREDERICK GORDON HAY BEDFORD,
 ALBERT WILLIAM PARR.